Patented June 25, 1940

2,205,704

UNITED STATES PATENT OFFICE 2,205,704

PROCESS FOR PRODUCING FREE CELLULOSE FIBER

George M. von Hassel, Berlin, Germany

No Drawing. Application April 12, 1937, Serial No. 136,435. In Germany September 25, 1936

4 Claims. (Cl. 8—137)

This invention relates to a process of producing free cellulose fiber, from bodies adhering to it, such as lignine, lignified parts of tissue, cuticular shreds, mineral impurities and the like, and to obtain it in a non-matted or non-entangled condition.

It has been suggested for the purpose of roughening fibers to treat them with sharp-cornered powder grains. Such procedure will necessarily greatly weaken and shorten the fine small fibers and not prevent premature matting or tangling thereof.

According to this invention fiber-containing materials, containing long or short fibers, or both, are prevented from getting matted or are untangled by causing the raw cellulose material or fiber-containing material, to expand or swell together with powdery or grain-shaped bodies, insoluble in water, such as chalk, kaolin, infusorial earth, sand, wood shavings or the like, whereupon the mass is dried and by means of air currents or other gas currents, or eddies exerting a pressing or suction effect, are directed through a series of sieves having varying sizes and forms of meshes to adapt them to the dimensions of the fibers to be handled or obtained, in such a manner, that the added substances and impurities will be removed and the fibers will be deposited as straight-lined as possible. The fiber-containing material to be handled may be obtained by means of any disintegrating or loosening process. Before being passed through the sieves, the dried material may be freed from most of the added substances interfering with matting, and from the natural impurities of the fibers, by being moved over sieves. The sieve arrangement, through which the fiber-containing material is passed, preferably, has all or some of its sieves connected with a source of electricity.

In this way the individual fibers will be separated from one another and kept separated during the entire drying process. Further treatment does not require any violent mechanical tearing apart of the fiber material, for instance, by means of the breaker or teaser, or combing which would result in damaging the individual fibers.

A mixed expanded or muddy mass may be obtained by converting the fiber-containing material into an expanded mass and then mixing this expanded mass with an expanded mass consisting of more or less grain-shaped or powder-shaped substances, insoluble in water, as, for instance, chalk, kaolin, infusorial earth, coloring matter, sand, wood shavings and the like. Instead, the fiber-containing material may be dipped, for instance, with the aid of a jolting or dipping sieve or immersing sieve, into the expanded or muddy mass of substances insoluble in water. It is of importance, that the surface of the individual fibers be in some manner coated with a fine layer of powder or that intermediate layers be formed between the fibers, so as to have the fibers remain separated from one another during the drying process.

Prior to drying the mixed expanded mass may be freed, as far as possible, from the water or the expanding or dilating liquid employed, for instance, by centrifugal action or filtering or the like. The drying may take place by means of direct admission of heat or by a current of warm air.

The dry mass is advantageously disintegrated, for instance, by means of sieves, into fibers and the added powder or granular material. This is followed by passing the already considerably cleaned fiber-containing material through a system of sieves arranged in succession, by the aid of air currents or other gas currents or eddies exerting a pressing or sucking action.

The sieves are provided with meshes of varying sizes and shapes, suited to the fiber-containing material and the impurities, so as to attain complete separation of the fibers from other bodies. Automatic selection or sorting of pure fibers is, for instance, attained by interposing sieves, which, for instance, have meshes of rectangular shape in connection with a certain width since a pure fiber, liberated from lignine or silicic acid and the like, behaves different when passing through sieves under pressure or suction action of a gas, than, for instance, a lignified fiber. This will yield as a final product a fiber-containing material, which will be flaky, non-matty, and free from lignified parts of tissue, cuticular shreds or other impurities.

This kind of sieving will further result in consequence of the special form of the meshes, for instance of a rectangular form, adapted to the fibers, in depositing the fibers laid out in the same direction, behind a sieve or at a following sieve. If a sieve of the usual kind with square meshes were used, all the fibers, not only the flexible cellulose fibers or pure fibers, but also the rigid lignified fibers would pass through the sieves with corresponding width of meshes, so that there can be no selection or sorting. If square meshes of a certain narrowness are used, a pad would form under the action of air pressure, which would contain the flexible pure fibers and at the same time also the lignified fibers.

It is of advantage to have among the sieves arranged in succession, also some which are in contact with the poles of a source of electricity. This will augment the sieving effect owing to the fact, that the electric attracting capacity acts different on fibrous substance than on mineral impurities.

For the purpose of augmenting the action of the sieves the latter may be moved mechanically against the air current or in such a manner, that the mass contained in the sieves will be continually agitated so that the air channels forming in the mass again and again will be clogged thereby. The transporting gas current will in this way be continually acting on the entire mass, thus accelerating the selection or sorting.

The operation of the invention, which from the standpoint of manufacture will be very simple and cheap, will take place in the following manner:

The fiber-containing material, irrespective of its origin or form at the time will be expanded or dilated or transformed to a mud and in this condition is placed into a dipping sieve and repeatedly dipped into a watery expanded mass of chalk, kaolin, infusorial earth, sand, wood shavings or the like, until a sample taken therefrom shows, that the surface of the fibers is coated with chalk powder or the like or the interstices are filled up with the powder material or granular material.

The mass consisting of fibers and chalk is freed by means of a fine sieve, a filter or a centrifugal separator or the like from water as much as possible and is thereupon completely dried in the air by an artificially generated current of gas or by the action of heat in a drying room.

The dry mass is then moved about in sieves or the like so that the powdery chalk or the like is detached from the fibers and passes through the sieves.

While the powdered chalk or the like may be used for further expanded masses, the fiber-containing material passes for further selection or sorting or for cleaning purposes through a series of moving sieves arranged in succession, some of which are connected with a source of electricity, the sieves having meshes of varying sizes and shape, corresponding, respectively, to the product to be obtained or to the length of the fiber, fineness of de-fibring and the desired selection. The fiber-containing material is transported through this sieve arrangement by means of air currents or other gas currents, with graduated pressing or sucking action.

I claim:

1. Process for freeing cellulose fiber from adhering impurities, such as lignine and the like, and obtaining the fiber in unmatted condition, comprising taking a mass of raw, mechanically disintegrated, fibrous vegetable matter containing impurities and working into said mass finely divided, water-insoluble material and water to form a mud, drying said mud and then blowing said dried mud through a series of sieves through which the finely divided material and impurities pass while the fibers are retained on said sieves.

2. Process according to claim 1, in which the step of working the fibrous matter and finely divided, water-insoluble material into a mud is performed by dipping the fibrous matter into a mixture of the finely divided material and water.

3. Process according to claim 1, and before the drying step, freeing the mud to some extent of the water content thereof.

4. Process according to claim 1, and before blowing the dried mixture through the series of sieves, mechanically agitating the mixture on a sieve to separate most of the finely divided material and impurities from the fiber.

GEORGE M. von HASSEL.